United States Patent
Doi

(10) Patent No.: US 10,883,018 B2
(45) Date of Patent: Jan. 5, 2021

(54) SUCTION CHUCKING TEMPORARY FIXING MEMBER

(71) Applicant: NITTO DENKO CORPORATION, Ibaraki (JP)

(72) Inventor: Kohei Doi, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 40 days.

(21) Appl. No.: 16/090,395

(22) PCT Filed: Feb. 27, 2017

(86) PCT No.: PCT/JP2017/007400
§ 371 (c)(1),
(2) Date: Oct. 1, 2018

(87) PCT Pub. No.: WO2017/175512
PCT Pub. Date: Oct. 12, 2017

(65) Prior Publication Data
US 2019/0106602 A1 Apr. 11, 2019

(30) Foreign Application Priority Data
Apr. 6, 2016 (JP) .................................. 2016-076598

(51) Int. Cl.
| | |
|---|---|
| *C09J 7/26* | (2018.01) |
| *C09J 183/04* | (2006.01) |
| *C09J 7/38* | (2018.01) |
| B32B 5/18 | (2006.01) |
| C08L 83/04 | (2006.01) |
| C08J 9/00 | (2006.01) |
| C08J 9/28 | (2006.01) |
| C08G 77/20 | (2006.01) |
| B32B 27/06 | (2006.01) |
| C08G 77/12 | (2006.01) |

(52) U.S. Cl.
CPC . *C09J 7/26* (2018.01); *C09J 7/38* (2018.01); *C09J 183/04* (2013.01); *B32B 5/18* (2013.01); *B32B 27/065* (2013.01); *B32B 2266/06* (2013.01); *B32B 2266/14* (2016.11); *B32B 2307/542* (2013.01); *B32B 2307/744* (2013.01); *B32B 2307/748* (2013.01); *B32B 2405/00* (2013.01); *C08G 77/12* (2013.01); *C08G 77/20* (2013.01); *C08J 9/0061* (2013.01); *C08J 9/0066* (2013.01); *C08J 9/28* (2013.01); *C08J 2201/0504* (2013.01); *C08J 2205/044* (2013.01); *C08J 2205/05* (2013.01); *C08J 2383/05* (2013.01); *C08J 2383/07* (2013.01); *C08J 2483/05* (2013.01); *C08L 83/04* (2013.01)

(58) Field of Classification Search
None
See application file for complete search history.

(56) References Cited

U.S. PATENT DOCUMENTS

| | | |
|---|---|---|
| 4,137,360 A | 1/1979 | Reischl |
| 5,165,976 A | 11/1992 | Newing et al. |
| 5,318,815 A | 6/1994 | Newing et al. |
| 8,227,520 B2 | 7/2012 | Shirasaki et al. |
| 8,334,037 B2 | 12/2012 | Sheridan et al. |
| 9,051,445 B2 | 6/2015 | Nozoe et al. |
| 9,346,979 B2 | 5/2016 | Sheridan et al. |
| 2008/0021125 A1 | 1/2008 | Shirasaki et al. |
| 2008/0280086 A1 | 11/2008 | Sheridan et al. |
| 2011/0021649 A1 | 1/2011 | Sakuma et al. |
| 2011/0184531 A1 | 7/2011 | Goraltchouk et al. |
| 2011/0190410 A1 | 8/2011 | Nozoe et al. |
| 2011/0319510 A1 | 12/2011 | Tsuchiyama et al. |
| 2013/0075027 A1 | 3/2013 | Sheridan et al. |
| 2013/0210301 A1 | 8/2013 | Hirao et al. |
| 2013/0216814 A1 | 8/2013 | Hirao et al. |
| 2013/0224467 A1 | 8/2013 | Hirao et al. |
| 2015/0213920 A1* | 7/2015 | Lee .................. B32B 5/18 428/71 |
| 2016/0053069 A1 | 2/2016 | Gotoh et al. |

FOREIGN PATENT DOCUMENTS

| | | | |
|---|---|---|---|
| CN | 1042170 A | 5/1990 | |
| CN | 1926195 A | 3/2007 | |
| CN | 101663358 A | 3/2010 | |
| CN | 101678653 A | 3/2010 | |
| EP | 2792706 A1 * | 10/2014 | ......... C08G 18/4837 |
| EP | 3395872 A1 | 10/2018 | |
| JP | H1-259043 A | 10/1989 | |
| JP | 2004-143332 A | 5/2004 | |
| JP | 2008-163060 A | 7/2008 | |
| JP | 2008-214625 A | 9/2008 | |
| JP | 2012-56985 A | 3/2012 | |

(Continued)

OTHER PUBLICATIONS

Iseki, Azusa, Foam Sheet, May 23, 2011, machine translation of JP2012-241146 (Year: 2012).*

(Continued)

*Primary Examiner* — Chinessa T. Golden
(74) *Attorney, Agent, or Firm* — Hauptman Ham, LLP

(57) ABSTRACT

An adsorption temporary fixing material comprises an adsorption temporary fixing sheet including a foam layer having an open-cell structure, wherein the adsorption temporary fixing material includes the foam layer in the entirety of the sheet or on at least one surface thereof, wherein a shear adhesive strength of a surface of the foam layer with a SUS304BA plate at 23° C. is 1 N/100 mm² or more at a tensile rate of 50 mm/min, wherein a peel strength of the surface of the foam layer from the SUS304BA plate at 23° C. is 1 N/20 mm or less at a peel angle of 180° and a tensile rate of 300 mm/min, and wherein a weight change ratio after the adsorption temporary fixing sheet has been immersed in distilled water for 1 minute and then water droplets have been wiped off the surface thereof is 50% or less.

12 Claims, No Drawings

(56) References Cited

FOREIGN PATENT DOCUMENTS

| JP | 2012-241146 A | | 12/2012 |
|---|---|---|---|
| JP | 2012241146 A | * | 12/2012 |
| JP | 2013-144788 A | | 7/2013 |
| JP | 2014-167067 A | | 9/2014 |
| JP | 5702899 B2 | | 4/2015 |
| WO | 2010/013847 A1 | | 2/2010 |
| WO | 2010/073654 A1 | | 7/2010 |
| WO | 2012/029537 A1 | | 3/2012 |

OTHER PUBLICATIONS

The extended European search report dated Sep. 24, 2019 for corresponding European Application No. 17778891.6, citing the above references.
International Search Report for corresponding international application PCT/JP2017/007400 dated May 30, 2017, citing the above references.
Office Action dated Jan. 7, 2020 for corresponding Japanese Application No. 2016-076598, along with an English translation, citing the above references.
Office Action issued for corresponding Taiwanese Patent Application No. 106110256 dated Aug. 6, 2020, along with an English translation.
Office Action issued for corresponding Chinese Patent Application No. 201780021824.9 dated Oct. 12, 2020, along with an English translation.

* cited by examiner

SUCTION CHUCKING TEMPORARY FIXING MEMBER

CROSS REFERENCE TO RELATED APPLICATION

This application claims the priority of Japanese Patent Application No. 2016-076598, filed on Apr. 6, 2016, in the JPO (Japanese Patent Office). Further, this application is the National Phase Application of International Application No. PCT/JP2017/007400, filed on Feb. 27, 2017, which designates the United States and was published in Japan. Both of the priority documents are hereby incorporated by reference in their entireties.

TECHNICAL FIELD

The present invention relates to an adsorption temporary fixing material.

BACKGROUND ART

A foam sheet having adsorptivity has heretofore been used as, for example, a sheet for preventing the overturning or slippage of furniture or home electric appliances, a backing material for a carpet, or a sheet that can be bonded and fixed to an automobile interior material, and that can be easily peeled.

A material, such as an acrylic resin or a rubber, has been mainly used for such foam sheet having adsorptivity (e.g., Patent Literature 1). However, an emulsion-based material has been mainstream, and hence the sheet is excellent in repeelability but has involved the following problem. The sheet is poor in water resistance, and hence when the sheet is washed with water at the time of its contamination, the sheet absorbs water to swell, thereby reducing its adsorptivity.

In addition, in the production of, for example, a display or organic EL lighting in an electronics industry, a material configured to temporarily fix a substrate and a fixing base to each other is used at the time of the performance of, for example, the vapor deposition of various metal films and an ITO film onto various film substrates (e.g., polyimide, PET, and PEN), glass, and a Si substrate, sputtering film formation, and pattern formation processing. A repeelable pressure-sensitive adhesive tape has been used as such material because the temporary fixing needs to be released after the film formation. Under the present circumstances, examples of such pressure-sensitive adhesive tape include a tape that is foamed by heating to be peeled, a cooling-peelable tape that can be peeled at low temperature, and an acrylic or silicone-based double-sided tape having a weak pressure-sensitive adhesive property.

However, when heating at a temperature as high as 150° C. or more is needed in the production process, an adhesive residue due to an increase in peel strength of a pressure-sensitive adhesive or the breakage of a substrate has been a problem. In addition, it is feared that the pressure-sensitive adhesive tape includes bubbles at the time of its bonding, and hence the smoothness of the substrate is lost and high-accuracy pattern formation processing is inhibited.

A silicone foam has been recently reported as a foam material that has a light weight, that is excellent in heat resistance and weatherability, and that has a low thermal conductivity. For example, there have been reported a silicone resin foam that contains a silicone resin cured product, and a plurality of particles dispersed in the silicone resin cured product and having cavity portions therein, and that is suitably used in a solar cell application (e.g., Patent Literature 2), and a silicone foam sheet in which cells are densely arranged, the uniformity of the sizes of the cells is high, the shapes of the cells are satisfactory, and a closed-cell ratio is high (e.g., Patent Literature 3).

However, the related-art silicone foam has a high closed-cell ratio, and hence involves a problem in that its bubble removability is poor and a problem in that its surface is liable to be rough. Accordingly, in the related-art silicone foam, adhesiveness reduces and a temporary fixing property based on adsorption cannot be satisfactorily expressed.

CITATION LIST

Patent Literature

[PTL 1] JP 01-259043 A
[PTL 2] JP 5702899 B2
[PTL 3] JP 2014-167067 A

SUMMARY OF INVENTION

Technical Problem

An object of the present invention is to provide an adsorption temporary fixing material having the following features: an adherend can be bonded and temporarily fixed to the material while the inclusion of bubbles is prevented; the material hardly peels from a specified position at both high and low temperatures; the material can be peeled without any adhesive residue when the temporary fixing is released; and even when the material is contaminated, its adsorptivity is restored by water washing, and hence the material can be repeatedly used.

Solution to Problem

According to one embodiment of the present invention, there is provided an adsorption temporary fixing material, including an adsorption temporary fixing sheet including a foam layer having an open-cell structure, wherein the adsorption temporary fixing material includes the foam layer in an entirety of the sheet or on at least one surface thereof, wherein a shear adhesive strength of a surface of the foam layer with a SUS304BA plate at 23° C. is 1 N/100 mm or more at a tensile rate of 50 mm/min, wherein a peel strength of the surface of the foam layer from the SUS304BA plate at 23° C. is 1 N/20 mm or less at a peel angle of 180° and a tensile rate of 300 mm/min, and wherein a weight change ratio after the adsorption temporary fixing material has been immersed in distilled water for 1 minute and then water droplets have been wiped off the surface thereof is 50% or less.

In one embodiment, the shear adhesive strength with the SUS304BA plate at 23° C. is 5 N/100 mm$^2$ or more at a tensile rate of 50 mm/min.

In one embodiment, the shear adhesive strength with the SUS304BA plate at 23° C. is 7 N/100 mm$^2$ or more at a tensile rate of 50 mm/min.

In one embodiment, the peel strength from the SUS304BA plate at 23° C. is 0.1 N/20 mm or less at a peel angle of 180° and a tensile rate of 300 mm/min.

In one embodiment, the peel strength from the SUS304BA plate at 23° C. is 0.05 N/20 mm or less at a peel angle of 180° and a tensile rate of 300 mm/min.

In one embodiment, in the adsorption temporary fixing material of the present invention, a shear adhesive strength of the surface of the foam layer with the SUS304BA plate at 150° C. is 1 N/100 mm$^2$ or more at a tensile rate of 50 mm/min.

In one embodiment, the shear adhesive strength with the SUS304BA plate at 150° C. is 3.5 N/100 mm$^2$ or more at a tensile rate of 50 mm/min.

In one embodiment, the shear adhesive strength with the SUS304BA plate at 150° C. is 5 N/100 mm$^2$ or more at a tensile rate of 50 mm/min.

In one embodiment, in the adsorption temporary fixing material of the present invention, a shear adhesive strength of the surface of the foam layer with the SUS304BA plate at −30° C. is 1 N/100 mm$^2$ or more at a tensile rate of 50 mm/min.

In one embodiment, the shear adhesive strength with the SUS304BA plate at −30° C. is 5 N/100 mm$^2$ or more at a tensile rate of 50 mm/min.

In one embodiment, the shear adhesive strength with the SUS304BA plate at −30° C. is 7 N/100 mm$^2$ or more at a tensile rate of 50 mm/min.

In one embodiment, in the adsorption temporary fixing material of the present invention, a vertical holding strength of the surface of the foam layer against a Bakelite plate at 150° C. and a load of 300 g is 0.5 mm or less.

In one embodiment, the foam layer has an open-cell ratio of 90% or more.

In one embodiment, the open-cell ratio is from 95% to 100%.

In one embodiment, the open-cell ratio is from 99% to 100%.

In one embodiment, the foam layer has an average cell diameter of from 1 μm to 200 μm.

In one embodiment, 90% or more of all cells of the foam layer each have a cell diameter of 300 μm or less.

In one embodiment, the foam layer has surface opening portions, and the surface opening portions have an average pore diameter of 150 μm or less.

In one embodiment, the foam layer has an apparent density of from 0.15 g/cm$^3$ to 0.80 g/cm$^3$.

In one embodiment, the apparent density is from 0.20 g/cm$^3$ to 0.70 g/cm$^3$.

In one embodiment, the foam layer includes a silicone foam layer.

In one embodiment, the silicone foam layer is formed by thermal curing of a silicone resin composition.

In one embodiment, the silicone resin composition includes at least: (A) 100 parts by weight of an organopolysiloxane having at least two alkenyl groups in a molecule thereof; (B) an organopolysiloxane having at least two silicon atom-bonded hydrogen atoms in a molecule thereof in such an amount that a number of moles of the silicon atom-bonded hydrogen atoms in the component (B) is from 0.4 mol to 20 mol with respect to 1 mol of the alkenyl groups in the component (A); (C) 100 parts by weight to 1,000 parts by weight of a mixture including water and an inorganic thickener; (D) 0.1 part by weight to 15 parts by weight of surfactants including (D-1) a nonionic surfactant having an HLB value of 3 or more and (D-2) a nonionic surfactant having an HLB value of less than 3, provided that a weight ratio of the component (D-1) to the component (D-2) is at least 1; (E) a hydrosilylation reaction catalyst; and (F) 0.001 part by weight to 5 parts by weight of a curing retarder.

In one embodiment, the adsorption temporary fixing material further includes a support on one surface side of the foam layer.

In one embodiment, the adsorption temporary fixing material further includes a pressure-sensitive adhesive layer on one surface side of the foam layer.

In one embodiment, the adsorption temporary fixing material further includes: a support on one surface side of the foam layer; and a pressure-sensitive adhesive layer on a surface of the support opposite to the foam layer.

In one embodiment, the adsorption temporary fixing material further includes: a support on one surface side of the foam layer; and another foam layer on a surface of the support opposite to the foam layer.

Advantageous Effects of Invention

According to the present invention, the adsorption temporary fixing material having the following features can be provided: an adherend can be bonded and temporarily fixed to the material while the inclusion of bubbles is prevented; the material hardly peels from a specified position at both high and low temperatures; the material can be peeled without any adhesive residue when the temporary fixing is released; and even when the material is contaminated, its adsorptivity is restored by water washing, and hence the material can be repeatedly used.

DESCRIPTION OF EMBODIMENTS

<<Adsorption Temporary Fixing Material>>

An adsorption temporary fixing material of the present invention is an adsorption temporary fixing sheet including a foam layer having an open-cell structure.

The adsorption temporary fixing material of the present invention includes the foam layer in the entirety of the sheet or on at least one surface thereof. The adsorption temporary fixing material of the present invention preferably includes the foam layer having the open-cell structure as an outermost layer or an outermost layer having arranged thereon a release liner (a release liner side is an outermost layer side).

The adsorption temporary fixing material of the present invention has the following features because the foam layer in the material has the open-cell structure: an adherend can be bonded and temporarily fixed to the material while the inclusion of bubbles is prevented; the material hardly peels from a specified position at both high and low temperatures; the material can be peeled without any adhesive residue when the temporary fixing is released; and even when the material is contaminated, its adsorptivity is restored by water washing, and hence the material can be repeatedly used.

The shear adhesive strength of the surface of the foam layer in the adsorption temporary fixing material of the present invention with a SUS304BA plate at 23° C. is 1 N/100 mm$^2$ or more, preferably 2 N/100 mm$^2$ or more, more preferably 3 N/100 mm$^2$ or more, still more preferably 5 N/100 mm$^2$ or more, particularly preferably 7 N/100 mm$^2$ or more at a tensile rate of 50 mm/min. In addition, an upper limit therefor is ideally as large as possible. In actuality, however, the upper limit is preferably 100 N/100 mm$^2$ or less, more preferably 80 N/100 mm$^2$ or less, still more preferably 50 N/100 mm$^2$ or less, particularly preferably 30 N/100 mm$^2$ or less. When the shear adhesive strength of the surface of the foam layer in the adsorption temporary fixing material of the present invention with the SUS304BA plate at 23° C. falls within the range at a tensile rate of 50 mm/min, an adherend can be bonded and temporarily fixed to the adsorption temporary fixing material of the present invention while the inclusion of bubbles is prevented, and the material hardly peels from a specified position.

The shear adhesive strength of the surface of the foam layer in the adsorption temporary fixing material of the present invention with the SUS304BA plate at 150° C. is preferably 1 N/100 mm² or more, more preferably 2 N/100 mm² or more, still more preferably 3.5 N/100 mm² or more, particularly preferably 5 N/100 mm² or more at a tensile rate of 50 mm/min. In addition, an upper limit therefor is ideally as large as possible. In actuality, however, the upper limit is preferably 100 N/100 mm² or less, more preferably 80 N/100 mm² or less, still more preferably 50 N/100 mm² or less, particularly preferably 30 N/100 mm² or less. When the shear adhesive strength of the surface of the foam layer in the adsorption temporary fixing material of the present invention with the SUS304BA plate at 150° C. falls within the range at a tensile rate of 50 mm/min, an adherend can be bonded and temporarily fixed to the adsorption temporary fixing material of the present invention while the inclusion of bubbles is further prevented, and the material hardly peels from a specified position even at higher temperature.

The shear adhesive strength of the surface of the foam layer in the adsorption temporary fixing material of the present invention with the SUS304BA plate at −30° C. is preferably 1 N/100 mm² or more, more preferably 3 N/100 mm² or more, still more preferably 5 N/100 mm² or more, particularly preferably 7 N/100 mm² or more at a tensile rate of 50 mm/min. In addition, an upper limit therefor is ideally as large as possible. In actuality, however, the upper limit is preferably 100 N/100 mm² or less, more preferably 80 N/100 mm² or less, still more preferably 50 N/100 mm² or less, particularly preferably 30 N/100 mm² or less. When the shear adhesive strength of the surface of the foam layer in the adsorption temporary fixing material of the present invention with the SUS304BA plate at −30° C. falls within the range at a tensile rate of 50 mm/min, an adherend can be bonded and temporarily fixed to the adsorption temporary fixing material of the present invention while the inclusion of bubbles is further prevented, and the material hardly peels from a specified position even at lower temperature.

The peel strength of the surface of the foam layer in the adsorption temporary fixing material of the present invention from the SUS304BA plate at 23° C. is 1 N/20 mm or less, preferably 0.5 N/20 mm or less, more preferably 0.3 N/20 mm or less, still more preferably 0.1 N/20 mm or less, particularly preferably 0.05 N/20 mm or less at a peel angle of 180° and a tensile rate of 300 mm/min. In addition, a lower limit therefor is ideally as light as possible. In actuality, however, the lower limit is preferably 0.000001 N/20 mm or more, more preferably 0.00001 N/20 mm or more, still more preferably 0.0001 N/20 mm or more, particularly preferably 0.005 N/20 mm or more. When the peel strength of the surface of the foam layer in the adsorption temporary fixing material of the present invention from the SUS304BA plate at 23° C. falls within the range at a peel angle of 180° and a tensile rate of 300 mm/min, the adsorption temporary fixing material of the present invention can be peeled without any adhesive residue when the temporary fixing is released.

The vertical holding strength of the surface of the foam layer in the adsorption temporary fixing material of the present invention against a Bakelite plate at 150° C. and a load of 300 g is preferably 0.5 mm or less, more preferably 0.3 mm or less, still more preferably 0.1 mm or less, particularly preferably 0 mm. When the vertical holding strength of the surface of the foam layer in the adsorption temporary fixing material of the present invention against the Bakelite plate at 150° C. and a load of 300 g falls within the range, the adsorption temporary fixing material of the present invention can express a more excellent temporary fixing property.

The weight change ratio of the adsorption temporary fixing material of the present invention after the adsorption temporary fixing material has been immersed in distilled water for 1 minute and then water droplets have been wiped off its surface is 50% or less, preferably 40% or less, more preferably 30% or less, still more preferably 20% or less, particularly preferably 10% or less, most preferably 5% or less. When the weight change ratio after the adsorption temporary fixing material of the present invention has been immersed in distilled water for 1 minute and then water droplets have been wiped off the surface falls within the range, even in the case where the adsorption temporary fixing material of the present invention is contaminated and hence washed with water, its adsorptivity is restored without its swelling, and hence the material can be repeatedly used.

The thickness of the foam layer is preferably from 10 μm to 3,000 μm, more preferably from 20 μm to 750 μm, still more preferably from 30 μm to 700 μm, particularly preferably from 40 μm to 650 μm, most preferably from 50 μm to 600 μm. Even when the thickness of the foam layer is small as described above, the adsorption temporary fixing material of the present invention can express an excellent temporary fixing property.

The foam layer has cells (spherical bubbles). The cells (spherical bubbles) may not be strictly spherical bubbles, and may be, for example, substantially spherical bubbles partially having strains or bubbles formed of spaces having large strains.

The foam layer has the open-cell structure. That is, the foam layer has an open-cell structure having a through-hole between adjacent cells. When the foam layer has the open-cell structure, through the combination of this feature with any other feature of the foam layer, the adsorption temporary fixing material expresses the following effects: the material can express excellent bubble removability; an adherend can be bonded and temporarily fixed to the material while the inclusion of bubbles is further prevented; the material more hardly peels from a specified position at both high and low temperatures; the material can be more easily peeled without any adhesive residue when the temporary fixing is released; and even when the material is contaminated, its adsorptivity is further restored by water washing, and hence the material can be repeatedly used. In addition, even when the thickness of the foam layer is reduced, the expression of those effects can be maintained.

The open-cell ratio of the foam layer is preferably 90% or more, more preferably from 90% to 100%, still more preferably from 92% to 100%, still further more preferably from 95% to 100%, particularly preferably from 99% to 100%, most preferably substantially 100%. When the open-cell ratio of the foam layer falls within the range, through the combination of this feature with any other feature of the foam layer, the adsorption temporary fixing material expresses the following effects: the material can express more excellent bubble removability; an adherend can be bonded and temporarily fixed to the material while the inclusion of bubbles is even further prevented; the material even more hardly peels from a specified position at both high and low temperatures; the material can be even more easily peeled without any adhesive residue when the temporary fixing is released; and even when the material is contaminated, its adsorptivity is even further restored by water washing, and hence the material can be repeatedly used. In addition, even when the thickness of the foam layer is reduced, the expression of those effects can be further maintained.

The average cell diameter of the foam layer is preferably from 1 µm to 200 µm, more preferably from 1.5 µm to 180 µm, still more preferably from 2 µm to 170 µm, particularly preferably from 2.5 µm to 160 µm, most preferably from 3 µm to 150 µm. When the average cell diameter in the foam layer falls within the range, through the combination of this feature with any other feature of the foam layer, the adsorption temporary fixing material expresses the following effects: the material can express more excellent bubble removability; an adherend can be bonded and temporarily fixed to the material while the inclusion of bubbles is even further prevented; the material even more hardly peels from a specified position at both high and low temperatures; the material can be even more easily peeled without any adhesive residue when the temporary fixing is released; and even when the material is contaminated, its adsorptivity is even further restored by water washing, and hence the material can be repeatedly used. In addition, even when the thickness of the foam layer is reduced, the expression of those effects can be further maintained.

In the foam layer, it is preferred that 90% or more of all the cells each have a cell diameter of 300 µm or less, it is more preferred that 92% or more of all the cells each have a cell diameter of 300 µm or less, it is still more preferred that 95% or more of all the cells each have a cell diameter of 300 µm or less, it is particularly preferred that 97% or more of all the cells each have a cell diameter of 300 µm or less, and it is most preferred that substantially 100% of all the cells each have a cell diameter of 300 µm or less. In addition, in the foam layer, it is more preferred that 90% or more of all the cells each have a cell diameter of 250 µm or less, it is still more preferred that 90% or more of all the cells each have a cell diameter of 200 µm or less, it is particularly preferred that 90% or more of all the cells each have a cell diameter of 180 µm or less, and it is most preferred that 90% or more of all the cells each have a cell diameter of 150 µm or less. When the ratio of cell diameters of 300 µm or less in the foam layer and the cell diameters of 90% or more of all the cells therein fall within the ranges, through the combination of these features with any other feature of the foam layer, the adsorption temporary fixing material expresses the following effects: the material can express more excellent bubble removability; an adherend can be bonded and temporarily fixed to the material while the inclusion of bubbles is even further prevented; the material even more hardly peels from a specified position at both high and low temperatures; the material can be even more easily peeled without any adhesive residue when the temporary fixing is released; and even when the material is contaminated, its adsorptivity is even further restored by water washing, and hence the material can be repeatedly used. In addition, even when the thickness of the foam layer is reduced, the expression of those effects can be further maintained.

A maximum cell diameter in all the cells in the foam layer is preferably 300 µm or less, more preferably 250 µm or less, still more preferably 200 µm or less, particularly preferably 180 µm or less, most preferably 150 µm or less. When the maximum cell diameter in all the cells in the foam layer falls within the range, through the combination of this feature with any other feature of the foam layer, the adsorption temporary fixing material expresses the following effects: the material can express more excellent bubble removability; an adherend can be bonded and temporarily fixed to the material while the inclusion of bubbles is even further prevented; the material even more hardly peels from a specified position at both high and low temperatures; the material can be even more easily peeled without any adhesive residue when the temporary fixing is released; and even when the material is contaminated, its adsorptivity is even further restored by water washing, and hence the material can be repeatedly used. In addition, even when the thickness of the foam layer is reduced, the expression of those effects can be further maintained.

A minimum cell diameter in all the cells in the foam layer is preferably 100 µm or less, more preferably 80 µm or less, still more preferably 70 µm or less, particularly preferably 60 µm or less, most preferably 50 µm or less. When the minimum cell diameter in all the cells in the foam layer falls within the range, through the combination of this feature with any other feature of the foam layer, the adsorption temporary fixing material expresses the following effects: the material can express more excellent bubble removability; an adherend can be bonded and temporarily fixed to the material while the inclusion of bubbles is even further prevented; the material even more hardly peels from a specified position at both high and low temperatures; the material can be even more easily peeled without any adhesive residue when the temporary fixing is released; and even when the material is contaminated, its adsorptivity is even further restored by water washing, and hence the material can be repeatedly used. In addition, even when the thickness of the foam layer is reduced, the expression of those effects can be further maintained.

Thus, when the foam layer has the open-cell structure and its cell diameters are preferably fine as described above, the adsorption temporary fixing material of the present invention is suitable as an adsorption temporary fixing material because of the following reasons: the material can express excellent bubble removability; an adherend can be bonded and temporarily fixed to the material while the inclusion of bubbles is prevented; the material hardly peels from a specified position at both high and low temperatures; the material can be peeled without any adhesive residue when the temporary fixing is released; and even when the material is contaminated, its adsorptivity is restored by water washing, and hence the material can be repeatedly used.

The foam layer preferably has surface opening portions. The term "surface opening portions" as used herein means opening portions that are present in the surface of the foam layer and have an average pore diameter of a certain size. When the foam layer has the surface opening portions, the adsorption temporary fixing material of the present invention has the following features: an adherend can be bonded and temporarily fixed to the material while the inclusion of bubbles is further prevented; the material more hardly peels from a specified position at both high and low temperatures; and the material can be more easily peeled without any adhesive residue when the temporary fixing is released. This is probably because the surface opening portions serve as appropriate suckers. Thus, the adsorption temporary fixing material of the present invention including the foam layer can further express such an excellent temporary fixing property as described above.

The opening ratio of the surface opening portions is preferably from 1% to 99%, more preferably from 2% to 95%, still more preferably from 3% to 90%, particularly preferably from 4% to 85%, most preferably from 5% to 80%. When the opening ratio of the surface opening portions falls within the range, the adsorption temporary fixing material of the present invention has the following features:

an adherend can be bonded and temporarily fixed to the material while the inclusion of bubbles is further prevented; the material more hardly peels from a specified position at both high and low temperatures; and the material can be more easily peeled without any adhesive residue when the temporary fixing is released.

The average pore diameter of the surface opening portions is preferably 150 µm or less, more preferably from 0.5 µm to 145 µm, still more preferably from 1.0 µm to 140 µm, particularly preferably from 1.5 µm to 135 µm, most preferably from 2.0 µm to 130 µm. When the average pore diameter of the surface opening portions falls within the range, the adsorption temporary fixing material of the present invention has the following features: an adherend can be bonded and temporarily fixed to the material while the inclusion of bubbles is further prevented; the material more hardly peels from a specified position at both high and low temperatures; and the material can be more easily peeled without any adhesive residue when the temporary fixing is released.

The apparent density of the foam layer is preferably from 0.15 g/cm$^3$ to 0.80 g/cm$^3$, more preferably from 0.20 g/cm$^3$ to 0.75 g/cm$^3$, still more preferably from 0.20 g/cm$^3$ to 0.70 g/cm$^3$, particularly preferably from 0.30 g/cm$^3$ to 0.70 g/cm$^3$. When the apparent density of the foam layer falls within the range, through the combination of this feature with any other feature of the foam layer, the adsorption temporary fixing material expresses the following effects: an adherend can be bonded and temporarily fixed to the material while the inclusion of bubbles is further prevented; the material more hardly peels from a specified position at both high and low temperatures; the material can be more easily peeled without any adhesive residue when the temporary fixing is released; and even when the material is contaminated, its adsorptivity is further restored by water washing, and hence the material can be repeatedly used. In addition, even when the thickness of the foam layer is reduced, the expression of those effects can be maintained.

In the adsorption temporary fixing material according to one embodiment of the present invention, the foam layer is a silicone foam layer.

In the adsorption temporary fixing material according to one embodiment of the present invention, the foam layer is formed of the silicone foam layer and a release liner.

The thickness of the release liner is preferably from 1 µm to 500 µm, more preferably from 3 µm to 450 µm, still more preferably from 5 µm to 400 µm, particularly preferably from 10 µm to 300 µm.

The release liner is, for example, a release liner obtained by subjecting the surface of a base material (liner base material), such as a polytetrafluoroethylene (PTFE) film, paper, or a plastic film, to silicone treatment or fluorinated silicone treatment. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyethylene naphthalate film, a polyurethane film, an ethylene-vinyl acetate copolymer film, a polyimide film, a polyamide (nylon) film, and an aromatic polyamide (aramid) film.

The adsorption temporary fixing material according to one embodiment of the present invention includes a support on one surface side of the foam layer. In this embodiment, a release liner may be arranged on the other surface of the foam layer.

The adsorption temporary fixing material according to one embodiment of the present invention includes a pressure-sensitive adhesive layer on one surface side of the foam layer. In this embodiment, a release liner may be arranged on the other surface of any one of the foam layer and the pressure-sensitive adhesive layer.

The adsorption temporary fixing material according to one embodiment of the present invention includes a support on one surface side of the foam layer, and includes a pressure-sensitive adhesive layer on the surface of the support opposite to the foam layer. That is, the material is in the following form: foam layer/support/pressure-sensitive adhesive layer. In this embodiment, a release liner may be arranged on the other surface of any one of the foam layer and the pressure-sensitive adhesive layer.

The adsorption temporary fixing material according to one embodiment of the present invention includes a support on one surface side of the foam layer, and includes another foam layer on the surface of the support opposite to the foam layer. That is, the material is in the following form: foam layer/support/foam layer. In this embodiment, a release liner may be arranged on the other surface of the foam layer.

Any appropriate support may be adopted as the support as long as the support can support the foam layer. Examples of such support include: a plastic film, sheet, or tape; paper; a nonwoven fabric; a metal foil or a metal mesh; and glass or a glass cloth. The number of the supports may be one, or may be two or more. In addition, in order that an anchoring property between the support and the foam layer may be improved, it is preferred that an undercoating agent, such as a silane coupling agent, be applied to the surface of the support, or the surface be subjected to surface treatment, such as corona treatment or plasma treatment.

Examples of the plastic film include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyethylene naphthalate film, a polyurethane film, an ethylene-vinyl acetate copolymer film, a polyimide film, a polyamide (nylon) film, and an aromatic polyamide (aramid) film.

A layer formed of any appropriate pressure-sensitive adhesive may be adopted as the pressure-sensitive adhesive layer. Examples of such pressure-sensitive adhesive include a rubber-based pressure-sensitive adhesive (e.g., a synthetic rubber-based pressure-sensitive adhesive or a natural rubber-based pressure-sensitive adhesive), a urethane-based pressure-sensitive adhesive, an acrylic urethane-based pressure-sensitive adhesive, an acrylic pressure-sensitive adhesive, a silicone-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive, and a fluorine-based pressure-sensitive adhesive. Those pressure-sensitive adhesives may be used alone or in combination thereof. The number of the pressure-sensitive adhesive layers may be one, or may be two or more.

The pressure-sensitive adhesives are classified into, for example, an emulsion-type pressure-sensitive adhesive, a solvent-type pressure-sensitive adhesive, an ultraviolet-cross-linkable (UV-cross-linkable) pressure-sensitive adhesive, an electron beam-cross-linkable (EB-cross-linkable) pressure-sensitive adhesive, and a hot-melt pressure-sensitive adhesive in terms of a pressure-sensitive adhesion form. Those pressure-sensitive adhesives may be used alone or in combination thereof.

In the adsorption temporary fixing material according to one embodiment of the present invention, any appropriate foam layer may be adopted to the extent that the effects of the present invention are not impaired. Examples of such foam layer include a silicone foam layer and an acrylic foam layer.

In one embodiment, the foam layer is a silicone foam layer.

The silicone foam layer is preferably formed by the heat curing of a silicone resin composition.

The silicone resin composition is preferably such a composition as described below.

The silicone resin composition includes at least: (A) 100 parts by weight of an organopolysiloxane having at least two alkenyl groups in a molecule thereof; (B) an organopolysiloxane having at least two silicon atom-bonded hydrogen atoms in a molecule thereof in such an amount that the number of moles of the silicon atom-bonded hydrogen atoms in the component (B) is from 0.4 mol to 20 mol with respect to 1 mol of the alkenyl groups in the component (A); (C) 100 parts by weight to 1,000 parts by weight of a mixture including water and an inorganic thickener; (D) 0.1 part by weight to 15 parts by weight of surfactants including (D-1) a nonionic surfactant having an HLB value of 3 or more and (D-2) a nonionic surfactant having an HLB value of less than 3, provided that the weight ratio of the component (D-1) to the component (D-2) is at least 1; (E) a hydrosilylation reaction catalyst; and (F) 0.001 part by weight to 5 parts by weight of a curing retarder.

The component (A) is the organopolysiloxane having at least two alkenyl groups in a molecule thereof, and is the main agent of the composition. Examples of the alkenyl groups in the component (A) include a vinyl group, an allyl group, and a hexenyl group. Of those, a vinyl group is preferred. In addition, examples of a silicon atom-bonded organic group except the alkenyl groups in the component (A) include: alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogen-substituted alkyl groups, such as a 3,3,3-trifluoropropyl group. Of those, amethyl group is preferred.

Specific examples of the component (A) include dimethylpolysiloxane blocked with a dimethylvinylsiloxy group, a dimethylsiloxane-methylphenylsiloxane copolymer blocked with a dimethylvinylsiloxy group, methylvinylpolysiloxane blocked with a trimethylsiloxy group, a dimethylsiloxane-methylvinylsiloxane copolymer blocked with a trimethylsiloxy group, and a dimethylsiloxane-methylvinylsiloxane-methylphenylsiloxane copolymer blocked with a trimethylsiloxy group. Of those, diorganopolysiloxane having a substantially linear main chain is preferred.

The component (B) is the organopolysiloxane having at least two silicon atom-bonded hydrogen atoms in a molecule thereof, and is the cross-linking agent of the composition. The bonding positions of the silicon atom-bonded hydrogen atoms in the component (B) are not limited, and are, for example, a molecular chain terminal and/or a molecular chain side chain. Examples of a silicon atom-bonded organic group except the hydrogen atoms in the component (B) include: alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogen-substituted alkyl groups, such as a 3,3,3-trifluoropropyl group. Of those, a methyl group is preferred.

Examples of such component (B) include dimethylpolysiloxane blocked with a dimethylhydrogensiloxy group, a dimethylsiloxane-methylhydrogensiloxane copolymer blocked with a dimethylhydrogensiloxy group, methylhydrogenpolysiloxane blocked with a trimethylsiloxy group, a dimethylsiloxane-methylhydrogensiloxane copolymer blocked with a trimethylsiloxy group, and an organopolysiloxane including a siloxane unit represented by $(CH_3)_3SiO_{1/2}$, a siloxane unit represented by $H(CH_3)_2SiO_{1/2}$, and a siloxane unit represented by $SiO_{4/2}$. Of those, a linear organopolysiloxane is preferred.

The content of the component (B) is such an amount that the number of moles of the silicon atom-bonded hydrogen atoms in the component (B) falls within the range of from 0.4 mol to 20 mol with respect to 1 mol of the alkenyl groups in the component (A), preferably such an amount that the number falls within the range of from 1.5 mol to 20 mol, more preferably such an amount that the number falls within the range of from 1.5 mol to 10 mol. This is because when the number of moles of the silicon atom-bonded hydrogen atoms in the component (B) falls within the range, the compression set of a silicone foam sheet to be obtained is improved.

The component (C) is the mixture including the water and the inorganic thickener, and is a component for providing a silicone rubber sponge through the removal of the water in the component (C) from a silicone rubber obtained by cross-linking the composition. The water in the component (C) is preferably ion-exchanged water because the component (C) is stably dispersed in the component (A).

The inorganic thickener in the component (C) is blended for increasing the viscosity of the water so that the component (C) may be easily dispersed in the component (A) and hence the state of dispersion of the component (C) may be stabilized. As the inorganic thickener, there are given natural or synthetic inorganic thickeners. Examples thereof include: natural or synthetic smectite clays, such as bentonite, montmorillonite, hectorite, saponite, sauconite, beidellite, and nontronite; magnesium aluminum silicate; and composites of those compounds and water-soluble organic polymers, such as a carboxyvinyl polymer. Of those, smectite clays, such as bentonite and montmorillonite, are preferred. For example, SUMECTON SA (manufactured by Kunimine Industries Co., Ltd.) serving as a hydrothermally synthesized product or BENGEL (manufactured by Hojun Co., Ltd.) serving as a naturally purified product is available as such smectite clay. The pH of such smectite clay preferably falls within the range of from 5.0 to 9.0 in terms of the maintenance of the heat resistance of the silicone rubber sponge. In addition, the content of the inorganic thickener in the component (C) preferably falls within the range of from 0.1 part by weight to 10 parts by weight, and more preferably falls within the range of from 0.5 part by weight to 5 parts by weight with respect to 100 parts by weight of the water.

The content of the component (C) falls within the range of from 100 parts by weight to 1,000 parts by weight, preferably falls within the range of from 100 parts by weight to 800 parts by weight, more preferably falls within the range of from 100 parts by weight to 500 parts by weight, still more preferably falls within the range of from 200 parts by weight to 500 parts by weight, and particularly preferably falls within the range of from 200 parts by weight to 350 parts by weight with respect to 100 parts by weight of the component (A). This is because of the following reasons: when the content of the component (C) is equal to or more than a lower limit for the range, a low-density silicone foam sheet can be formed; meanwhile, when the content is equal to or less than an upper limit for the range, a silicone foam sheet having a uniform and fine open-cell structure can be formed.

The surfactants serving as the component (D) include (D-1) the nonionic surfactant having an HLB value of 3 or more and (D-2) the nonionic surfactant having an HLB value of less than 3. Examples of the surfactants serving as the component (D) include a glycerin fatty acid ester, a polyglycerin fatty acid ester, a sorbitan fatty acid ester, a sucrose fatty acid ester, a polyethylene glycol fatty acid ester, a polypropylene glycol fatty acid ester, a polyoxyethylene glycerin fatty acid ester, a polyoxyethylene sorbitan fatty acid ester, a polyoxyethylene-polyoxypropylene block copolymer, a polyoxyethylene alkyl ether, a polyoxyethylene alkyl phenyl ether, and a polyoxyethylene fatty acid amide.

The component (D) includes the component (D-1) and the component (D-2), and the weight ratio of the component (D-1) to the component (D-2) is at least 1, preferably at least 5, more preferably at least 8, still more preferably at least 10, particularly preferably at least 15. In addition, the weight ratio of the component (D-1) to the component (D-2) is preferably at most 100, more preferably at most 80, at most 70, at most 60, or at most 50. This is because of the following reasons: when the weight ratio is more than the lower limit, a low-density silicone foam sheet having a uniform and fine open-cell structure can be formed; meanwhile, when the weight ratio is less than the upper limit, the component (C) can be dispersed in the component (A) and the component (B) with satisfactory stability, and as a result, a silicone foam sheet having a uniform and fine open-cell structure can be formed.

The content of the component (D) falls within the range of from 0.1 part by weight to 15 parts by weight, preferably falls within the range of from 0.2 part by weight to 3 parts by weight with respect to 100 parts by weight of the component (A). This is because of the following reasons: when the content of the component (D) is equal to or more than a lower limit for the range, a silicone foam sheet having a uniform and fine open-cell structure can be formed; meanwhile, when the content is equal to or less than an upper limit for the range, a silicone foam sheet excellent in heat resistance can be formed.

The component (E) is the hydrosilylation reaction catalyst for accelerating the hydrosilylation reaction of the silicone resin composition, and examples thereof include a platinum-based catalyst, a palladium-based catalyst, and a rhodium-based catalyst. Of those, a platinum-based catalyst is preferred. Examples of such component (E) include: chloroplatinic acid; an alcohol-modified chloroplatinic acid; a coordination compound of chloroplatinic acid and an olefin, vinylsiloxane, or an acetylene compound; a coordination compound of platinum and an olefin, vinylsiloxane, or an acetylene compound; tetrakis(triphenylphosphine)palladium; and chlorotris(triphenylphosphine)rhodium.

The content of the component (E) is an amount enough to cross-link the silicone resin composition. Specifically, the content is preferably such an amount that the content of a catalytic metal in the component (E) falls within the range of from 0.01 ppm to 500 ppm in terms of a weight with respect to the total amount of the component (A) and the component (B), and is more preferably such an amount that the content falls within the range of from 0.1 ppm to 100 ppm.

(F) The curing retarder may be incorporated for adjusting the curing rate and working pot life of the silicone resin composition. Examples of such component (F) include alkyne alcohols, such as 3-methyl-1-butyn-3-ol, 3,5-dimethyl-1-hexyn-3-ol, 3-phenyl-1-butyn-3-ol, and 1-ethynyl-1-cyclohexanol. The content of the component (F), which is appropriately selected in accordance with a use method and molding method for the silicone resin composition, generally falls within the range of from 0.001 part by weight to 5 parts by weight with respect to 100 parts by weight of the component (A).

(G) Reinforcing silica fine powder may be further incorporated into the silicone resin composition in terms of an improvement in strength of the silicone foam sheet to be obtained. Such component (G) is silica fine powder having a BET specific surface area of preferably from 50 $m^2/g$ to 350 $m^2/g$, more preferably from 80 $m^2/g$ to 250 $m^2/g$, and examples thereof include fumed silica and precipitated silica. In addition, such silica fine powder may be subjected to surface treatment with an organosilane or the like.

The content of the component (G) is at most 20 parts by weight, preferably at most 15 parts by weight, more preferably at most 10 parts by weight with respect to 100 parts by weight of the component (A). In addition, the content of the component (G) is preferably at least 0.1 part by weight with respect to 100 parts by weight of the component (A).

A pigment, such as carbon black or red oxide, may be incorporated into the silicone resin composition to the extent that the object of the present invention is not impaired.

The silicone resin composition can be easily produced by uniformly mixing the respective components or a composition obtained by blending the components with various additives as required with known kneading means. Examples of a mixer to be used here include a homomixer, a paddle mixer, a homodisper, a colloid mill, a vacuum mixing/stirring mixer, and a rotation-revolution mixer. However, the mixer is not particularly limited as long as the component (C) and the component (D) can be sufficiently dispersed in the component (A).

<<Method of Producing Adsorption Temporary Fixing Material>>

A case in which the foam layer is a silicone foam layer is described as an example of a method of producing the adsorption temporary fixing material. In the case where the foam layer is any other foam layer, the following description of the production method only needs to be read, for example, while the silicone resin composition is replaced with a composition serving as a raw material for the other foam layer. The adsorption temporary fixing material to be produced in the case where the foam layer is the silicone foam layer is sometimes referred to as "silicone foam sheet."

A method of producing a silicone foam sheet according to one embodiment includes: applying a silicone resin composition containing at least a thermosetting silicone resin and water onto a base material A (the step is hereinafter referred to as "step (1)"); mounting a base material B on the surface of the applied silicone resin composition opposite to the base material A (the step is hereinafter referred to as "step (2)"); thermally curing the silicone resin composition (the step is hereinafter referred to as "step (3)"); and removing the base material A and/or the base material B, followed by heat drying (the step is hereinafter referred to as "step (4)") to form the silicone foam sheet.

A method of producing a silicone foam sheet according to another embodiment includes: applying a silicone resin composition containing at least a thermosetting silicone resin and water onto a base material A (the step is hereinafter referred to as "step (1)"); mounting a base material B on the surface of the applied silicone resin composition opposite to the base material A (the step is hereinafter referred to as "step (2)"); thermally curing the silicone resin composition (the step is hereinafter referred to as "step (3)"); removing the base material A and/or the base material B, followed by heat drying (the step is hereinafter referred to as "step (4)"); and bonding the resultant to a support (the step is hereinafter referred to as "step (5)") to form the silicone foam sheet.

When the base material A or the base material B is used as a support, in order that its anchoring property with the foam layer may be improved, it is preferred that an undercoating agent, such as a silane coupling agent, be applied to the surface of the base material A or the base material B serving as a support, or the surface be subjected to surface treatment, such as corona treatment or plasma treatment.

The base material A to be used in the step (1) and the base material B to be used in the step (2) are each preferably a plastic, metal, or glass sheet or film having no air permeability. As a material for such sheet or film, there are given, for example: olefin-based resins each containing an α-olefin as a monomer component, such as polyethylene (PE), polypropylene (PP), and an ethylene-vinyl acetate copolymer (EVA); polyester-based resins, such as polyethylene terephthalate (PET), polyethylene naphthalate (PEN), and polybutylene terephthalate (PBT); polyvinyl chloride (PVC); vinyl acetate-based resins; polyphenylene sulfide (PPS); amide-based resins, such as polyamide (nylon) and a wholly aromatic polyamide (aramid); polyimide-based resins; polyether ether ketone (PEEK); copper; aluminum; and any appropriate glass. There is also given, for example, a release liner obtained by subjecting the surface of a base material (liner base material), such as a polytetrafluoroethylene (PTFE) film, paper, or a plastic film, to silicone treatment or fluorinated silicone treatment. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyethylene naphthalate film, a polyurethane film, an ethylene-vinyl acetate copolymer film, a polyimide film, a polyamide (nylon) film, and an aromatic polyamide (aramid) film. In the case where there is a base material that is not removed at the time of the heat drying in the step (4), a release liner that may be used as the base material is preferably the release liner obtained by subjecting the surface of the base material (liner base material), such as the polytetrafluoroethylene (PTFE) film, the paper, or the plastic film, to the fluorinated silicone treatment. In the case where there is a base material that is not removed at the time of the heat drying in the step (4), when the release liner obtained by subjecting the surface of the base material (liner base material), such as the polytetrafluoroethylene (PTFE) film, the paper, or the plastic film, to the fluorinated silicone treatment is used as the base material, its peeling after the heat drying can be easily performed. In addition, the pressure-sensitive adhesive layer described in the foregoing may be arranged on the base material A or the base material B.

The base material A to be used in the step (1) and the base material B to be used in the step (2) may be identical to each other, or may be different from each other. In addition, each of the base material A to be used in the step (1) and the base material B to be used in the step (2) may be formed only of one layer, or may be formed of two or more layers.

In accordance with the degree of hydrophilicity or hydrophobicity of the surface of each of the base material A to be used in the step (1) and the base material B to be used in the step (2) in contact with the silicone resin composition, the shape of the surface of the silicone resin composition in contact with the surface changes. For example, when a base material having high hydrophilicity, such as a polyethylene terephthalate (PET) film, is used as the base material A or the base material B, many surface opening portions each having a fine diameter can be caused to be present in the surface of the silicone resin composition in contact with the base material. In addition, for example, when a base material having high hydrophobicity, such as a polyethylene terephthalate (PET) release liner subjected to fluorinated silicone treatment, is used as the base material A or the base material B, a small number of surface opening portions each having a fine diameter can be caused to be present in the surface of the silicone resin composition in contact with the base material. Therefore, when the silicone foam sheet is to be caused to express high air permeability or high adsorptivity, a base material having high hydrophilicity is preferably used, and when the silicone foam sheet is to be caused to express high cut-off performance or high dust resistance, a base material having high hydrophobicity is preferably used. In addition, when repeelability between the silicone foam sheet and a base material is needed, a base material having high hydrophobicity is preferably used. The degree of hydrophilicity or hydrophobicity may be defined by, for example, a contact angle with water. For example, when the contact angle with water is less than 90°, a base material may be defined as being hydrophilic, and when the contact angle with water is 90° or more, the base material may be defined as being hydrophobic.

The thickness of each of the base material A to be used in the step (1) and the base material B to be used in the step (2) is preferably from 1 μm to 500 μm, more preferably from 3 μm to 450 μm, still more preferably from 5 μm to 400 μm, particularly preferably from 10 μm to 300 μm. When the thickness of each of the base material A to be used in the step (1) and the base material B to be used in the step (2) is set within the range, the silicone foam sheet can be efficiently produced.

In the step (3), the silicone resin composition is thermally cured. The temperature of the heat curing is preferably 50° C. or more and less than 100° C. because the silicone resin composition can be thermally cured with efficiency. When the temperature of the heat curing is less than 50° C., it may take too long time to perform the heat curing. When the temperature of the heat curing is 100° C. or more, moisture in the silicone resin composition sandwiched between the base material A and the base material B to be brought into a substantially closed state may volatilize to cause the coarsening of cells to be formed or an increase in density thereof. A product formed from the silicone resin composition by the step (3) is referred to as "silicone foam sheet precursor."

When a special heat curing method in which the silicone resin composition is thermally cured while being sandwiched between the base material A and the base material B to be brought into a substantially closed state like the step (3) is performed, the silicone resin composition is thermally cured under a state in which the moisture therein is not removed, and in cooperation with the subsequent step (4), the silicone foam sheet having an open-cell structure and fine cell diameters can be effectively obtained.

In the step (4), a product obtained by removing the base material A and/or the base material B is subjected to heat drying. The removal of the base material A and/or the base material B releases the substantially closed state in the step (3), and the heat drying in the released state efficiently volatilizes and removes the moisture from the silicone foam sheet precursor formed in the step (3) to provide the silicone foam sheet. A heat drying temperature in the step (4) is preferably from 120° C. to 250° C. because the silicone foam sheet can be effectively formed. When the heat drying temperature in the step (4) is less than 120° C., it may take too long time to perform the drying and the curing, and the silicone foam sheet having an open-cell structure and fine cell diameters may not be obtained. When the heat drying temperature in the step (4) is more than 250° C., it may become difficult to form the sheet owing to the shrinkage or expansion of a base material.

In the step (5), after the step (4), the resultant is bonded to the support to form the silicone foam sheet.

EXAMPLES

Now, the present invention is described specifically by way of Examples. However, the present invention is by no means limited to Examples. Test and evaluation methods in Examples and the like are as described below. The term "part(s)" in the following description means "part(s) by weight" unless otherwise specified, and the term "%" in the following description means "weight %" unless otherwise specified.

<Measurement of Sheet Thickness>

Measurement was performed with a thickness gauge JA-257 (terminal size: 20 mmφ in each of upper and lower terminals) (manufactured by Ozaki MFG. Co., Ltd.).

<Measurement of Cell Diameter>

An average cell diameter (μm) was determined by capturing an enlarged image of a section of a foam (foam sheet) with a low-vacuum scanning electron microscope ("S-3400N Scanning Electron Microscope", manufactured by Hitachi High-Tech Science Systems Corporation) and analyzing the image. The number of analyzed cells is 20. The minimum cell diameter (μm) and maximum cell diameter (μm) of the foam (foam sheet) were each determined by the same method.

<Measurement of Apparent Density>

A foam (foam sheet) was punched with a punching blade die measuring 100 mm by 100 mm, and the dimensions of the punched sample were measured. In addition, its thickness was measured with a 1/100 dial gauge in which the diameter (φ) of a measurement terminal was 20 mm. The volume of the foam (foam sheet) was calculated from those values.

Next, the weight of the foam (foam sheet) was measured with an even balance having a minimum scale of 0.01 g or more. The apparent density (g/cm³) of the foam (foam sheet) was calculated from those values.

<Observation of Cell Structure (Whether or Not Open-cell Structure is Present)>

An enlarged image of a section of a foam (foam sheet) was captured with a low-vacuum scanning electron microscope ("S-3400N Scanning Electron Microscope", manufactured by Hitachi High-Tech Fielding Corporation), and the presence or absence of a through-hole of a cell wall was confirmed.

<Measurement of Open-cell Ratio>

An open-cell ratio was measured as described below.

That is, a foam (foam sheet) was sunk in water, and was left to stand under a reduced pressure of −750 mmHg for 3 minutes so that air in its bubbles was replaced with the water. The weight of the absorbed water was measured, and the volume of the absorbed water was calculated by defining the density of the water as 1.0 g/cm³, followed by the calculation of the open-cell ratio from the following equation.

Open-cell ratio (%)={(volume of absorbed water)/(volume of bubble portions)}×100

The volume of the bubble portions was calculated from the following equation.

Volume (cm³) of bubble portions={(weight of foam (foam sheet))/(apparent density of foam (foam sheet))}−{(weight of foam (foam sheet))/(resin density)}

The resin density is a value obtained by measuring the density of a resin molded body produced by removing an emulsifying agent in a resin forming the foam.

<Measurement of Average Pore Diameter of Surface Opening Portions>

The average pore diameter (μm) of surface opening portions was determined by capturing an enlarged image of the surface of a foam (foam sheet) with a low-vacuum scanning electron microscope ("S-3400N Scanning Electron Microscope", manufactured by Hitachi High-Tech Fielding Corporation) and analyzing the image. The number of analyzed pores is 20.

<Evaluation of Bubble Removability>

A sample was bonded to a SUS304BA plate, and its adhesive property and bubble removability at the time of one reciprocation of a 2-kilogram roller were evaluated.

○: The sample is bonded to the plate without the inclusion of bubbles.

×: The sample is bonded to the plate with the inclusion of bubbles, or is not bonded thereto.

<Measurement of Shear Adhesive Strength>

A SUS304BA plate was bonded to each of both surfaces of a sample measuring 30 mm long by 30 mm wide at such a position that the center line of the sample and the center line of the SUS304BA plate coincided with each other, and a 2-kilogram roller was reciprocated once to pressure-bond the sample and the plates together. 30 Minutes after the pressure bonding, the resultant test body was left at rest under respective environments at −30° C., 23° C., and 150° C. for 30 minutes each, and was set in a tensile tester so that the center line of the sample and the center line of a clamp were present on one straight line, and a force was applied to the sample in a direction parallel to the center line of the sample. A maximum load required for the test body to rupture at the time of its pulling at a tensile rate of 50 mm/min was measured. The number of times of the test was set to five, and the average of the five measured values was determined. The shear adhesive strength of the sample was measured by subjecting the average to proportional conversion into a value per 100 mm².

<Measurement of Holding Strength>

A sample was cut into a size measuring 10 mm by 100 mm. Its measurement surface was bonded to a Bakelite plate so as to have a bonded area measuring 10 mm by 20 mm, and a 2-kilogram roller was reciprocated once to pressure-bond the sample and the plate together. After the pressure bonding, the resultant was left at rest under environments at −30° C., 23° C., and 150° C. for 30 minutes each. The Bakelite plate was fixed so that the sample became vertical thereto, and the resultant was left to stand for 1 hour while a load of 300 g was applied to the sample on one side of the resultant, followed by the measurement of the shift amount of the position at which the sample was bonded.
◯: No shift of the sample is present.
Δ: The shift of the sample is 5 mm or less.
×: The sample falls.
<Measurement of 180° Peel Test Strength>

A sample having a width of 20 mm was bonded to a SUS304BA plate, and a 2-kilogram roller was reciprocated once to pressure-bond the sample and the plate together. 30 Minutes after the pressure bonding, a peel strength (N/20 mm) at the time of the peeling of the sample with Tensilon at a peel angle of 180° and a tensile rate of 300 mm/min was measured.
<Evaluation with Glass>

A sample measuring 30 mm long by 30 mm wide was bonded to a glass plate having a thickness of 0.5 mm, and a 2-kilogram roller was reciprocated once to pressure-bond the sample and the plate together. After the resultant had been heated at 150° C. for 1 hour, the peelability of the glass and the possibility of the reuse of the sample after the peeling were evaluated.
(1) Glass Peelability
◯: An adhesive residue or the like does not adhere to the glass, and the glass can be peeled without breakage.
×: An adhesive residue or the like adheres to the glass, or the glass cannot be peeled because the glass is strongly bonded to the sample.
(2) Whether or Not Sample can be Reused
◯: The sample does not show an external appearance change or a shape change, and hence can be reused.
×: The sample shows an external appearance change or a shape change, and hence cannot be reused.
<Evaluation of Water Washing Resistance>
(1) Shape Change A sample measuring 30 mm long by 30 mm wide was immersed in distilled water for 1 minute, and then water droplets were lightly wiped off its surface with a waste cloth, followed by the evaluation of its shape change.
◯: The sample is free of warping and deflection, and does not show a dimensional change of ±1 mm or more.
×: The sample has warping or deflection, or shows a dimensional change of ±1 mm or more.
(2) Weight Change Ratio A sample measuring 30 mm long by 30 mm wide was immersed in distilled water for 1 minute, and then water droplets were lightly wiped off its surface with a waste cloth, followed by the evaluation of its weight change and the calculation of its weight change ratio from the following equation.

Weight change ratio (%)={(weight of sample after immersion−weight of sample before immersion)/(weight of sample before immersion)}×100

(3) Shear Adhesive Strength Change

A sample measuring 30 mm long by 30 mm wide was immersed in distilled water for 1 minute, and then water droplets were lightly wiped off its surface with a waste cloth. A SUS304BA plate was bonded to each of both surfaces of the sample at such a position that the center line of the sample and the center line of the SUS304BA plate coincided with each other, and a 2-kilogram roller was reciprocated once to pressure-bond the sample and the plates together. 30 Minutes after the pressure bonding, under an environment at 23° C., the resultant test body was set in a tensile tester so that the center line of the sample and the center line of a clamp were present on one straight line, and a force was applied to the sample in a direction parallel to the center line of the sample. A maximum load required for the test body to rupture at the time of its pulling at a tensile rate of 50 mm/min was measured. The number of times of the test was set to five, and the average of the five measured values was determined. The shear adhesive strength of the sample was measured by subjecting the average to proportional conversion into a value per 100 mm$^2$.

Example 1

83.45 Parts by weight of dimethylpolysiloxane having a vinyl group content of 0.28 weight %, 6.40 parts by weight of methylhydrogenpolysiloxane having a silicon atom-bonded hydrogen atom content of 0.7 weight % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.9 part by weight of smectite clay (aqueous additive, purified bentonite composited with an organic polymer, manufactured by Hojun Co., Ltd.), 99.1 parts by weight of ion-exchanged water, 6.50 parts by weight of fumed silica having a BET specific surface area of 225 m$^2$/g, the fumed silica having been subjected to surface treatment with hexamethyldisilazane, 2.40 parts by weight of red oxide (product name: BAYFERROX, manufactured by Bayer AG), 0.98 part by weight of a nonionic surfactant (sorbitan fatty acid ester, product name: RHEODOL SP-010V, manufactured by Kao Corporation, HLB: 4.3), 0.045 part by weight of a nonionic surfactant (sorbitan fatty acid ester, product name: RHEODOL SP-030V, manufactured by Kao Corporation, HLB: 1.8), 0.02 part by weight of 1-ethynyl-1-cyclohexanol, and 0.22 part by weight of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation). Next, the emulsified liquid was dried under reduced pressure at room temperature for 5 minutes to be defoamed. The liquid was applied onto a fluorosilicone-treated PET film (NIPPA SHEET PET38×1-SS4A, manufactured by Nippa) with an applicator, and a PET film (Lumirror S10, manufactured by Toray Industries, Inc.) was mounted from above the liquid, followed by heating with a hot-air oven at 85° C. for 6 minutes to cure a silicone resin. After the curing, the PET film on one side was peeled, and heat drying was performed at 200° C. for 3 minutes. Thus, an adsorption temporary fixing material (1) including a silicone foam sheet having a thickness of 200 μm and an apparent density of 0.52 g/cm$^3$ was obtained.

The results of the various measurements of the resultant adsorption temporary fixing material (1) and the results of the evaluations thereof are shown in Table 1.

Comparative Example 1

100 Parts by weight of an acrylic emulsion solution (solid content: 55%, ethyl acrylate-butyl acrylate-acrylonitrile copolymer (weight ratio=45:48:7)), 2 parts by weight of a fatty acid ammonium-based surfactant (aqueous dispersion of ammonium stearate, solid content: 33%) (surfactant A), 2 parts by weight of a carboxybetaine-type amphoteric surfactant ("AMOGEN CB-H", manufactured by DKS Co., Ltd.) (surfactant B), 4 parts by weight of an oxazoline-based cross-linking agent ("EPOCROS WS-500", manufactured by Nippon Shokubai Co., Ltd., solid content: 39%), 1 part by weight of a pigment (carbon black) ("NAF-5091", manufactured by Dainichiseika Color & Chemicals Mfg. Co., Ltd.), and 0.6 part by weight of a polyacrylic acid-based thickener (ethyl acrylate-acrylic acid copolymer (acrylic acid: 20 weight %), solid content: 28.7%) were stirred and mixed with a disper ("ROBOMIX", manufactured by PRIMIX Corporation) to be foamed. The foamed composition was applied onto a polyethylene terephthalate (PET) film subjected to peeling treatment (thickness: 38 μm, product name: "MRF #38", manufactured by Mitsubishi Plastics, Inc.), and was dried at 70° C. for 4.5 minutes and then at 140° C. for 4.5 minutes. Thus, a temporary fixing material (C1) including a foam sheet having a thickness of 200 μm and an apparent density of 0.31 g/cm$^3$ was obtained.

The results of the various measurements of the resultant temporary fixing material (C1) and the results of the evaluations thereof are shown in Table 1.

Comparative Example 2

173.2 Parts by weight of a monomer solution formed of 2-ethylhexyl acrylate (manufactured by Toagosei Co., Ltd., hereinafter abbreviated as "2EHA") serving as an ethylenically unsaturated monomer, 100 parts by weight of ADEKA (trademark) PLURONIC L-62 (molecular weight: 2,500, manufactured by Adeka Corporation, polyether polyol) serving as polyoxyethylene-polyoxypropylene glycol, and 0.014 part by weight of dibutyltin dilaurate (manufactured by Kishida Chemical Co., Ltd., hereinafter abbreviated as "DBTL") serving as a urethane reaction catalyst were loaded into a reaction vessel including a cooling tube, a temperature gauge, and a stirring apparatus. While the materials were stirred, 12.4 parts by weight of hydrogenated xylylene diisocyanate (manufactured by Takeda Pharmaceutical Company Limited, TAKENATE 600, hereinafter abbreviated as "HXDI") was dropped into the materials, and the mixture was subjected to a reaction at 65° C. for 4 hours. A ratio "NCO/OH" (equivalent ratio) between the usage amounts of a polyisocyanate component and a polyol component was 1.6. After that, 5.6 parts by weight of 2-hydroxyethyl acrylate (manufactured by Kishida Chemical Co., Ltd., hereinafter abbreviated as "HEA") was dropped into the resultant, and the mixture was subjected to a reaction at 65° C. for 2 hours to provide a mixed syrup of a hydrophilic polyurethane-based polymer having acryloyl groups at both of its terminals and the ethylenically unsaturated monomer. The resultant hydrophilic polyurethane-based polymer had a weight-average molecular weight of 15,000. 48 Parts by weight of 2EHA and 12 parts by weight of acrylic acid (manufactured by Toagosei Co., Ltd., hereinafter abbreviated as "AA") serving as a polar monomer were added to 100 parts by weight of the resultant hydrophilic polyurethane-based polymer/ethylenically unsaturated monomer mixed syrup. Thus, a hydrophilic polyurethane-based polymer/ethylenically unsaturated monomer mixed syrup 1 was obtained.

100 Parts by weight of the resultant hydrophilic polyurethane-based polymer/ethylenically unsaturated monomer mixed syrup 1 was uniformly mixed with 10 parts by weight of 1,6-hexanediol diacrylate (manufactured by Shin-Nakamura Chemical Co., Ltd., product name: "NK ESTER A-HD-N") (molecular weight: 226), 56 parts by weight of urethane acrylate (hereinafter abbreviated as "UA") having ethylenically unsaturated groups at both of its terminals (molecular weight: 3,720), which had been obtained by treating both terminals of polyurethane synthesized from polytetramethylene glycol (hereinafter abbreviated as "PTMG") and isophorone diisocyanate (hereinafter abbreviated as "IPDI") serving as reactive oligomers with HEA, 0.5 part by weight of diphenyl (2,4,6-trimethylbenzoyl) phosphine oxide (manufactured by BASF, product name: "LUCIRIN TPO"), and 1.0 part by weight of a hindered phenol-based antioxidant (manufactured by Ciba Japan K.K., product name: "IRGANOX 1010"). Thus, a continuous oil phase component (hereinafter referred to as "oil phase") was obtained. Meanwhile, with respect to 100 parts by weight of the oil phase, 300 parts by weight of ion-exchanged water serving as a water phase component (hereinafter referred to as "water phase") was continuously dropped and supplied under normal temperature into a stirring mixer serving as an emulsifier having loaded thereinto the oil phase. Thus, a stable W/O-type emulsion was prepared. A weight ratio between the water phase and the oil phase was 75/25.

The W/O-type emulsion that had been left at rest and stored under normal temperature for 30 minutes after the preparation was applied onto a 38-micrometer thick polyethylene terephthalate film (hereinafter referred to as "PET film") subjected to release treatment so that the thickness of a foam layer after light irradiation became 200 μm, and the emulsion was continuously formed into a sheet shape. Further, the top of the sheet was covered with a 38-micrometer thick PET film subjected to release treatment. The sheet was irradiated with UV light having a light illuminance of 5 mW/cm$^2$ (measured with TOPCON UVR-T1 having a peak sensitivity maximum wavelength of 350 nm) by using a black light (15 W/cm). Thus, a high-water content cross-linked polymer having a thickness of 210 μm was obtained. Next, the upper-surface film was peeled, and the high-water content cross-linked polymer was heated at 130° C. over 10 minutes. Thus, a temporary fixing material (C2) including a foam pressure-sensitive adhesive body having a thickness of 0.2 mm was obtained.

The results of the various measurements of the resultant temporary fixing material (C2) and the results of the evaluations thereof are shown in Table 1.

Comparative Example 3

A commercial silicone-based foam ("NanNex HT-800", manufactured by Rogers Inoac Corporation) was used as a temporary fixing material (C3). The temporary fixing material (C3) had a thickness of 800 μm and a density of 0.32 g/cm$^3$.

The results of the various measurements of the resultant temporary fixing material (C3) and the results of the evaluations thereof are shown in Table 1.

Comparative Example 4

A commercial silicone/acrylic double-sided tape ("No. 5303W", manufactured by Nitto Denko Corporation) was used as a temporary fixing material (C4). The temporary fixing material (C4) had a thickness of 85 μm.

The results of the various measurements of the resultant temporary fixing material (C4) and the results of the evaluations thereof are shown in Table 1.

Comparative Example 5

A temporary fixing material (C5) was produced in the same manner as in Example 1 except that the smectite clay and ion-exchanged water of Example 1 were removed. The temporary fixing material (C5) had a thickness of 200 μm and a density of 1.00 g/cm$^3$.

The results of the various measurements of the resultant temporary fixing material (C5) and the results of the evaluations thereof are shown in Table 1.

Corporation, HLB: 4.3), 0.045 part by weight of a nonionic surfactant (sorbitan fatty acid ester, product name: RHEODOL SP-030V, manufactured by Kao Corporation, HLB:

TABLE 1

| | | Example 1 | Comparative Example 1 | Comparative Example 2 | Comparative Example 3 | Comparative Example 4 | Comparative Example 5 |
|---|---|---|---|---|---|---|---|
| Temporary fixing material | | Adsorption temporary fixing material (1) | Temporary fixing material (C1) | Temporary fixing material (C2) | Temporary fixing material (C3) | Temporary fixing material (C4) | Temporary fixing material (C5) |
| Material | | Silicone foam | Acrylic foam | Acrylic fine-cell foam | Silicone foam | Silicone/acrylic double-sided tape | Silicone rubber |
| Thickness (mm) | | 0.2 | 0.2 | 0.2 | 0.8 | 0.085 | 0.2 |
| Open-cell ratio (%) | | 100 | 100 | 100 | 10 | — | — |
| Cell diameter | Average cell diameter (μm) | 10 | 80 | 3 | 700 | — | — |
| | Maximum cell diameter (μm) | 30 | 150 | 5 | 800 | — | — |
| | Minimum cell diameter (μm) | 1 | 40 | 1 | 550 | — | — |
| | Average pore diameter of surface opening portions (μm) | 5.2 | 25 | 2.3 | 0 | — | — |
| Apparent density (g/cm$^3$) | | 0.52 | 0.31 | 0.28 | 0.32 | 1 | 1.00 |
| Shear adhesive strength (N/100 mm$^2$) | −30° C. | 7.7 | 11 | 9.1 | 0.4 | 9.7 | 6.4 |
| | 23° C. | 7.2 | 11.5 | 18.1 | 0.8 | 8.4 | 5.8 |
| | 150° C. | 5.8 | 3.1 | 4.9 | 0.1 | 7.0 | 2.0 |
| Holding strength (holding for 60 minutes) Load: 300 g/200 mm$^2$ | −30° C. | ○ | ○ | ○ | x | ○ | ○ |
| | 40° C. | ○ | ○ | ○ | x | ○ | ○ |
| | 150° C. | ○ | ○ | x | x | ○ | x |
| 180° peel test strength (N/20 mm) | | 0.01 | 0.07 | 0.19 | 0.00 | 11 (Silicone pressure-sensitive adhesive surface) | 0.01 |
| Bubble removability | | ○ | ○ | ○ | x | x (Silicone pressure-sensitive adhesive surface) | x |
| Glass peelability after heating at 150° C. for 1 hour | Whether or not glass can be peeled (glass breakage and adhesive residue) | ○ | x Adhesion by cohesive failure | ○ | ○ | ○ | ○ |
| | Whether or not sample can be reused (external appearance and shape change) | ○ | x Cohesive failure | ○ | ○ | x External appearance change | ○ |
| Water washing resistance | Dimensional change & warping after water washing | ○ | x Swelling | x Shrinkage | ○ | ○ | ○ |
| | Weight change ratio after water washing (%) | 0 | 94 | 245 | 1 | 1 | 0 |
| | Shear adhesive strength after water washing (N/100 mm$^2$) | 6.5 | 0.02 | 8.5 | 0.05 | 8 | 5.5 |
| | Change in shear adhesive strength after water washing as compared to that before water washing (%) | 9.7 | 99.8 | 53.0 | 93.8 | 3.6 | 5.2 |

Example 2

83.45 Parts by weight of dimethylpolysiloxane having a vinyl group content of 0.28 weight %, 6.40 parts by weight of methylhydrogenpolysiloxane having a silicon atom-bonded hydrogen atom content of 0.7 weight % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.9 part by weight of smectite clay (aqueous additive, purified bentonite composited with an organic polymer, manufactured by Hojun Co., Ltd.), 99.1 parts by weight of ion-exchanged water, 6.50 parts by weight of fumed silica having a BET specific surface area of 225 m$^2$/g, the fumed silica having been subjected to surface treatment with hexamethyldisilazane, 2.40 parts by weight of red oxide (product name: BAYFERROX, manufactured by Bayer AG), 0.98 part by weight of a nonionic surfactant (sorbitan fatty acid ester, product name: RHEODOL SP-010V, manufactured by Kao Corporation, HLB: 1.8), 0.02 part by weight of 1-ethynyl-1-cyclohexanol, and 0.22 part by weight of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation). Next, the emulsified liquid was dried under reduced pressure at room temperature for 5 minutes to be defoamed.

The liquid was applied onto a PET film (Lumirror S10, manufactured by Toray Industries, Inc.) with an applicator, and a PET film (Lumirror S10, manufactured by Toray Industries, Inc.) was mounted from above the liquid, followed by heating with a hot-air oven at 85° C. for 6 minutes to cure a silicone resin. After the curing, the PET film on one side was peeled, and the remainder was heated and dried at 200° C. for 3 minutes. After the drying, a base material-less silicone pressure-sensitive adhesive was bonded to the back surface of the PET film on the other side. Thus, an adsorption temporary fixing material (2) including a laminate of a silicone foam sheet having a thickness of 200 μm and an apparent density of 0.52 g/cm³, the PET film, and the silicone pressure-sensitive adhesive was obtained.

Example 3

83.45 Parts by weight of dimethylpolysiloxane having a vinyl group content of 0.28 weight %, 6.40 parts by weight of methylhydrogenpolysiloxane having a silicon atom-bonded hydrogen atom content of 0.7 weight % (the amount of the methylhydrogenpolysiloxane was such that the number of moles of silicon atom-bonded hydrogen atoms in the methylhydrogenpolysiloxane was 5 mol with respect to 1 mol of vinyl groups in the dimethylpolysiloxane), 0.9 part by weight of smectite clay (aqueous additive, purified bentonite composited with an organic polymer, manufactured by Hojun Co., Ltd.), 99.1 parts by weight of ion-exchanged water, 6.50 parts by weight of fumed silica having a BET specific surface area of 225 m²/g, the fumed silica having been subjected to surface treatment with hexamethyldisilazane, 2.40 parts by weight of red oxide (product name: BAYFERROX, manufactured by Bayer AG), 0.98 part by weight of a nonionic surfactant (sorbitan fatty acid ester, product name: RHEODOL SP-010V, manufactured by Kao Corporation, HLB: 4.3), 0.045 part by weight of a nonionic surfactant (sorbitan fatty acid ester, product name: RHEODOL SP-030V, manufactured by Kao Corporation, HLB: 1.8), 0.02 part by weight of 1-ethynyl-1-cyclohexanol, and 0.22 part by weight of a solution of a 1,3-divinyltetramethyldisiloxane complex of platinum in 1,3-divinyltetramethyldisiloxane (platinum metal content: about 4,000 ppm) were emulsified with AWATORI RENTARO (manufactured by Thinky Corporation). Next, the emulsified liquid was dried under reduced pressure at room temperature for 5 minutes to be defoamed.

The liquid was applied onto a fluorosilicone-treated PET film (NIPPA SHEET PET38×1-SS4A, manufactured by Nippa) with an applicator, and a fluorosilicone-treated PET film (NIPPA SHEET PET38×1-554A, manufactured by Nippa) was mounted from above the liquid, followed by heating with a hot-air oven at 85° C. for 6 minutes to cure a silicone resin. After the curing, the fluorosilicone-treated PET film on one side was peeled, and the remainder was heated and dried at 200° C. for 3 minutes. After the drying, the fluorosilicone-treated PET film on the other side was also peeled, and a base material-less silicone pressure-sensitive adhesive was bonded to the remainder. Thus, an adsorption temporary fixing material (3) including a laminate of a silicone foam sheet having a thickness of 200 μm and an apparent density of 0.45 g/cm³, and the silicone pressure-sensitive adhesive was obtained.

INDUSTRIAL APPLICABILITY

The adsorption temporary fixing material of the present invention can be utilized as a temporary fixing material in various fields because of the following reasons: the material can express excellent bubble removability; an adherend can be bonded and temporarily fixed to the material while the inclusion of bubbles is prevented; the material hardly peels from a specified position at both high and low temperatures; the material can be peeled without any adhesive residue when the temporary fixing is released; and even when the material is contaminated, its adsorptivity is restored by water washing, and hence the material can be repeatedly used.

The invention claimed is:

1. An adsorption temporary fixing material, comprising an adsorption temporary fixing sheet including a foam layer having an open-cell structure,
   wherein the adsorption temporary fixing material includes the foam layer in an entirety of the sheet or on at least one surface thereof,
   wherein a shear adhesive strength of a surface of the foam layer with a SUS304BA plate at 23° C. is 1 N/100 mm² or more at a tensile rate of 50 mm/min,
   wherein a peel strength of the surface of the foam layer from the SUS304BA plate at 23° C. is 1 N/20 mm or less at a peel angle of 180° and a tensile rate of 300 mm/min,
   wherein a weight change ratio after the adsorption temporary fixing material has been immersed in distilled water for 1 minute and then water droplets have been wiped off the surface thereof is 50% or less,
   wherein the foam layer comprises a silicone foam layer,
   wherein the silicone foam layer is formed by thermal curing of a silicone resin composition, and
   wherein the silicone resin composition comprises at least:
   (A) 100 parts by weight of an organopolysiloxane having at least two alkenyl groups in a molecule thereof;
   (B) an organopolysiloxane having at least two silicon atom-bonded hydrogen atoms in a molecule thereof in such an amount that a number of moles of the silicon atom-bonded hydrogen atoms in the component (B) is from 0.4 mol to 20 mol with respect to 1 mol of the alkenyl groups in the component (A);
   (C) 100 parts by weight to 1,000 parts by weight of a mixture including water and an inorganic thickener;
   (D) 0.1 part by weight to 15 parts by weight of surfactants including (D-1) a nonionic surfactant having an HLB value of 3 or more and (D-2) a nonionic surfactant having an HLB value of less than 3, provided that a weight ratio of the component (D-1) to the component (D-2) is at least 1;
   (E) a hydrosilylation reaction catalyst; and
   (F) 0.001 part by weight to 5 parts by weight of a curing retarder.

2. The adsorption temporary fixing material according to claim 1, wherein a shear adhesive strength of the surface of the foam layer with the SUS304BA plate at 150° C. is 1 N/100 mm² or more at a tensile rate of 50 mm/min.

3. The adsorption temporary fixing material according to claim 1, wherein a vertical holding strength of the surface of the foam layer against a Bakelite plate at 150° C. and a load of 300 g is 0.5 mm or less.

4. The adsorption temporary fixing material according to claim 1, wherein the foam layer has an open-cell ratio of 90% or more.

5. The adsorption temporary fixing material according to claim 1, wherein the foam layer has an average cell diameter of from 1 μm to 200 μm.

6. The adsorption temporary fixing material according to claim 1, wherein 90% or more of all cells of the foam layer each have a cell diameter of 300 μm or less.

7. The adsorption temporary fixing material according to claim 1, wherein the foam layer has surface opening portions, and the surface opening portions have an average pore diameter of 150 μm or less.

8. The adsorption temporary fixing material according to claim 1, wherein the foam layer has an apparent density of from 0.15 g/cm³ to 0.80 g/cm³.

9. The adsorption temporary fixing material according to claim 1, further comprising a support on one surface side of the foam layer.

10. The adsorption temporary fixing material according to claim 1, further comprising a pressure-sensitive adhesive layer on one surface side of the foam layer.

11. The adsorption temporary fixing material according to claim 1, further comprising:
   a support on one surface side of the foam layer; and
   a pressure-sensitive adhesive layer on a surface of the support opposite to the foam layer.

12. The adsorption temporary fixing material according to claim 1, further comprising:
   a support on one surface side of the foam layer; and
   another foam layer on a surface of the support opposite to the foam layer.

* * * * *